(12) United States Patent
Falger et al.

(10) Patent No.: US 12,325,664 B2
(45) Date of Patent: *Jun. 10, 2025

(54) TWO-COMPONENT MORTAR SYSTEM BASED ON ALUMINOUS CEMENT AND USE THEREOF

(71) Applicant: Hilti Aktiengesellschaft, Schaan (LI)

(72) Inventors: Christian Falger, Selters (DE); Armin Pfeil, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 373 days.

This patent is subject to a terminal disclaimer.

(21) Appl. No.: 17/533,381

(22) Filed: Nov. 23, 2021

(65) Prior Publication Data

US 2022/0098107 A1    Mar. 31, 2022

Related U.S. Application Data

(63) Continuation of application No. 15/764,897, filed as application No. PCT/EP2016/075024 on Oct. 19, 2016, now Pat. No. 11,214,519.

(30) Foreign Application Priority Data

Oct. 20, 2015  (EP) .................................. 15190503

(51) Int. Cl.

| | | |
|---|---|---|
| *C04B 28/06* | (2006.01) | |
| *C04B 14/28* | (2006.01) | |
| *C04B 22/06* | (2006.01) | |
| *C04B 22/14* | (2006.01) | |
| *C04B 22/16* | (2006.01) | |
| *C04B 24/04* | (2006.01) | |
| *C04B 24/06* | (2006.01) | |
| *C04B 40/06* | (2006.01) | |
| *E04B 1/41* | (2006.01) | |
| *C04B 103/00* | (2006.01) | |
| *C04B 103/14* | (2006.01) | |
| *C04B 103/24* | (2006.01) | |
| *C04B 103/30* | (2006.01) | |
| *C04B 111/00* | (2006.01) | |

(52) U.S. Cl.
CPC ............ *C04B 28/065* (2013.01); *C04B 14/28* (2013.01); *C04B 22/062* (2013.01); *C04B 22/147* (2013.01); *C04B 22/16* (2013.01); *C04B 24/04* (2013.01); *C04B 24/06* (2013.01); *C04B 28/06* (2013.01); *C04B 40/0625* (2013.01); *C04B 40/065* (2013.01); *C04B 40/0666* (2013.01); *E04B 1/4157* (2013.01); *C04B 2103/0008* (2013.01); *C04B 2103/14* (2013.01); *C04B 2103/24* (2013.01); *C04B 2103/30* (2013.01); *C04B 2111/00715* (2013.01); *Y02W 30/91* (2015.05)

(58) Field of Classification Search
CPC ....... C04B 14/06; C04B 14/104; C04B 14/28; C04B 18/146; C04B 20/008; C04B 20/0088; C04B 2103/0008; C04B 2103/0094; C04B 2103/12; C04B 2103/14; C04B 2103/22; C04B 2103/24; C04B 2103/30; C04B 2103/32; C04B 2103/44; C04B 2103/67; C04B 2111/00715; C04B 22/062; C04B 22/142; C04B 22/143; C04B 22/147; C04B 22/16; C04B 22/165; C04B 24/003; C04B 24/04; C04B 24/06; C04B 24/38; C04B 24/383; C04B 24/386; C04B 28/06; C04B 28/065; C04B 40/0625; C04B 40/065; C04B 40/0666; C04B 2111/00724; C04B 2111/28; C04B 40/0658; E04B 1/4157; Y02W 30/91

See application file for complete search history.

(56) References Cited

U.S. PATENT DOCUMENTS

| | | |
|---|---|---|
| 3,826,665 A | 7/1974 | Hovasse et al. |
| 4,190,454 A | 2/1980 | Yamagisi et al. |
| 4,832,535 A | 5/1989 | Crambes |
| 5,565,026 A | 10/1996 | Hense et al. |
| 6,107,368 A | 8/2000 | Roland et al. |

(Continued)

FOREIGN PATENT DOCUMENTS

| | | |
|---|---|---|
| CN | 104125936 | 10/2014 |
| DE | 2 311 239 | 10/1973 |

(Continued)

OTHER PUBLICATIONS

KR100804682B1 translation 2008 (Year: 2008).*

(Continued)

*Primary Examiner* — Shuangyi Abu Ali
(74) *Attorney, Agent, or Firm* — Grüneberg and Myers PLLC

(57) ABSTRACT

A multi-component mortar system contains a curable aqueous-phase aluminous cement component A and an initiator component B in aqueous-phase for initiating the curing process. Component A further contains at least one plasticizer, water, and at least one blocking agent selected from phosphoric acid, metaphosphoric acid, phosphorous acid, and phosphonic acids. Component B contains an initiator, at least one retarder, at least one mineral filler, and water. A multi-component system is useful, which is ready-for-use, for chemical fastening of anchoring means, preferably of metal elements, in mineral surfaces, such as structures made of brickwork, concrete, pervious concrete or natural stone as well as its use for chemical fastening of anchoring means.

7 Claims, No Drawings

(56) References Cited

U.S. PATENT DOCUMENTS

| | | | |
|---|---|---|---|
| 6,481,174 B1 * | 11/2002 | Munger | B05C 7/00 |
| | | | 52/749.1 |
| 8,017,058 B2 | 9/2011 | Oba et al. | |
| 8,801,851 B2 | 8/2014 | Jezequel et al. | |
| 8,808,449 B2 | 8/2014 | Jezequel et al. | |
| 9,216,927 B2 | 12/2015 | Hagen et al. | |
| 9,950,954 B2 | 4/2018 | Mikaelsson | |
| 10,815,157 B2 | 10/2020 | Sharmak et al. | |
| 10,822,284 B2 | 11/2020 | Pfeil et al. | |
| 11,214,518 B2 | 1/2022 | Pfeil et al. | |
| 11,214,519 B2 | 1/2022 | Falger et al. | |
| 11,214,526 B2 | 1/2022 | Pfeil et al. | |
| 11,267,765 B2 | 3/2022 | Sharmark et al. | |
| 11,279,659 B2 | 3/2022 | Pfeil et al. | |
| 2003/0073766 A1 | 4/2003 | Bode | |
| 2005/0239630 A1 | 10/2005 | Oba et al. | |
| 2007/0266906 A1 | 11/2007 | Garcia | |
| 2009/0032999 A1 | 2/2009 | Oba et al. | |
| 2009/0151604 A1 | 6/2009 | Hirao et al. | |
| 2010/0175589 A1 * | 7/2010 | Charpentier | C04B 40/065 |
| | | | 106/692 |
| 2011/0067600 A1 | 3/2011 | Constantz et al. | |
| 2011/0259228 A1 | 10/2011 | Mills et al. | |
| 2012/0312193 A1 | 12/2012 | Jezequel et al. | |
| 2012/0315464 A1 | 12/2012 | Refouvelet et al. | |
| 2012/0318171 A1 | 12/2012 | Jezequel et al. | |
| 2013/0295378 A1 | 11/2013 | Bonin et al. | |
| 2014/0121303 A1 | 5/2014 | Hagen et al. | |
| 2014/0216653 A1 | 8/2014 | Wu et al. | |
| 2014/0235760 A1 | 8/2014 | Bichler et al. | |
| 2014/0343194 A1 | 11/2014 | Taquet et al. | |
| 2015/0141554 A1 | 5/2015 | Mikaelsson | |
| 2015/0203407 A1 | 7/2015 | Girot et al. | |
| 2017/0349498 A1 | 12/2017 | Bernard et al. | |
| 2018/0251404 A1 | 9/2018 | Pfeil et al. | |
| 2018/0290935 A1 | 10/2018 | Pfeil et al. | |
| 2018/0305265 A1 | 10/2018 | Pfeil et al. | |
| 2018/0319712 A1 | 11/2018 | Seip | |
| 2019/0071353 A1 | 3/2019 | Pfeil et al. | |
| 2020/0377424 A1 | 12/2020 | Sharmak et al. | |
| 2022/0162131 A1 | 5/2022 | Pfeil et al. | |

FOREIGN PATENT DOCUMENTS

| | | |
|---|---|---|
| DE | 19728252 | 1/1999 |
| DE | 102010062061 | 5/2012 |
| DE | 102011102454 | 11/2012 |
| EP | 0 005 987 | 12/1979 |
| EP | 0 081 385 | 6/1983 |
| EP | 0 353 062 | 1/1990 |
| EP | 0 495 336 | 7/1992 |
| EP | 0 650 942 | 5/1995 |
| EP | 1 535 887 | 6/2005 |
| EP | 2 162 410 | 5/2011 |
| EP | 2 607 330 | 6/2013 |
| EP | 2 679 560 | 1/2014 |
| EP | 3 078 646 | 10/2016 |
| FR | 2 918 055 | 1/2009 |
| FR | 2 956 397 | 8/2011 |
| FR | 3 030 504 | 6/2016 |
| GB | 2 166 430 | 5/1986 |
| GB | 2 188 922 | 10/1987 |
| KR | 10-0804682 | 2/2008 |
| RU | 2 341 624 | 12/2008 |
| WO | 01/028955 | 4/2001 |
| WO | 2013/004621 | 1/2013 |
| WO | 2013/093344 | 6/2013 |
| WO | 2014/009298 | 1/2014 |
| WO | 2017/067951 | 4/2017 |
| WO | 2017/067953 | 4/2017 |
| WO | 2017/067954 | 4/2017 |
| WO | 2017/067956 | 4/2017 |
| WO | 2017/076807 | 5/2017 |

OTHER PUBLICATIONS

International Search Report issued Jan. 19, 2017 in PCT/EP2016/075024.
International Search Report issued Apr. 24, 2018 in PCT/EP2018/058065.
Office Action issued Dec. 8, 2020 in U.S. Appl. No. 16/498,231, 18 pages.
Office Action issued Dec. 31, 2020 in U.S. Appl. No. 16/498,231, 17 pages.
Written Opinion of the International Searching Authority issued Jan. 19, 2017 in PCT/EP2016/075024.
Written Opinion issued Apr. 24, 2018 in PCT/EP2018/058065.
U.S. Pat. No. 10,822,284, filed Nov. 3, 2020, 2018/0290935, Pfeil et al.
U.S. Appl. No. 15/765,504, filed Apr. 19, 2018, 2019/0071353, Pfeil et al.
U.S. Appl. No. 15/765,509, filed Apr. 3, 2018, 2018/0251404, Pfeil et al.
U.S. Appl. No. 15/769,444, filed Apr. 19, 2018, 2018/0305265, Pfeil et al.
U.S. Appl. No. 16/498,231, filed Sep. 26, 2019, 2020/0377424, Sharmak et al.
ICC Evaluation Service, LLC, "Acceptance Criteria for Post-Installed Adhesive Anchors in Concrete Elements (AC308)", approved Jun. 2016, 70 pages.
ICC Evaluation Service, LLC, "Acceptance Criteria for Post-Installed Adhesive Anchors in Concrete Elements (AC308)", approved 2017, 71 pages.
International Search Report dated Jan. 20, 2017, in PCT/EP2016/075023, 7 pages.
Meinheit et al., "Qualification of Post-Installed Adhesive Anchors in Concrete (ACI 355.4-11) and Commentary", American Concrete Institute ACI Committee 355; Aug. 2011, 59 pages.
U.S. Office Action dated Dec. 9, 2022, in U.S. Appl. No. 17/650,162, 12 pages.
Written Opinion dated Jan. 20, 2017, in PCT/EP2016/075023, 8 pages.
U.S. Appl. No. 17/650,162, filed Feb. 7, 2022, 2022/0162131, Pfeil et al.

* cited by examiner

TWO-COMPONENT MORTAR SYSTEM BASED ON ALUMINOUS CEMENT AND USE THEREOF

CROSS-REFERENCE TO RELATED APPLICATIONS

This application is a continuation of U.S. application Ser. No. 15/764,897, filed on Mar. 30, 2018, which was the National Stage entry under § 371 of International Application No. PCT/EP2016/075024, filed on Oct. 19, 2016, and which claims the benefit of priority to European Application No. 15190503.1, filed on Oct. 20, 2015. The content of each of these applications is hereby incorporated by reference in its entirety.

BACKGROUND OF THE INVENTION

Field of the Invention

The present invention pertains to a two-component mortar system for chemical fastening of anchoring means in mineral surfaces, comprising a curable aqueous-phase aluminous cement component A and an initiator component B in aqueous-phase for initiating the curing process, component A further comprising at least one blocking agent selected from the group consisting of phosphoric acid, metaphosphoric acid, phosphorous acid and phosphonic acids, at least one plasticizer and water, and component B comprising an initiator, at least one retarder, at least one mineral filler and water. Moreover, the present invention pertains to a two-component system, which is ready-for-use, for chemical fastening of anchoring means, preferably of metal elements, in mineral surfaces, such as structures made of brickwork, concrete, pervious concrete or natural stone as well as its use for chemical fastening of anchoring means.

Description of Related Art

Many two-component mortar systems, which are sometimes also referred to as kit-of-parts, exist, in which each of the components is intended to be mixed prior to use or during application in order to initiate the curing process to provide good chemical fastening of anchoring means in mineral surfaces. For example, organic systems based on free-radically polymerizable resins are used when fast curing is desired. However, such systems are generally known to be polluting, expensive, potentially hazardous and/or toxic for the environment and for the person who handles them and they often need to be specifically labelled. Moreover, organic systems often show a much reduced stability when thermally exposed to strong sunlight or otherwise elevated temperatures thereby decreasing their mechanical performance when it comes to chemically fastening of anchoring means.

In order to overcome these drawbacks, predominantly mineral systems based on aluminous cement have been developed. Aluminous cement has as its major constituent monocalcium aluminate and is widely used in the building and construction industries as the final products evidence a high level of mechanical performance over extended periods of time. Also, aluminous cement is resistant to bases and attains its maximum strength more rapidly than Portland cement and is capable of withstanding solutions of sulfates. Hence, aluminous cement systems are preferably employed in the field of chemical anchoring.

EP 2 162 410 describes a ready-for-use dual-component system including a part A based aqueous-phase aluminous cement, retarded by boric acid or a salt thereof, and a part B for initiating the curing process. The initiator in part B is made of only lithium salts. The system cures in less than 5 minutes after mixing of the two parts. EP 0 081 385 also discloses a dual-component system including a set-inhibited aqueous high alumina cement composition and a reactivator composition. The set inhibitor is boric acid and the reactivator composition includes lithium salts.

However, these aluminous cement aqueous suspensions retarded by boric acid or salts thereof are often not very stable for a sufficient time to be stored prior to use. Moreover, boric acid is quite toxic as well as ecotoxic.

EP 2 794 510 describes a stabilized aqueous suspension comprising aluminous cement and/or calcium sulfoaluminate cement, which is inhibited by a phosphorous-containing compound and can be stored for a sufficient time also at high temperatures. Said stabilized aqueous suspension can serve as a base for surface coatings.

When it comes to chemically fastening anchoring means in mineral surfaces, a rapid curing time, i.e. of less than 5 minutes, is not always desired. Further, most of the known systems lack sufficient fluidity for most practical applications of the resultant compositions. Often such prior art compositions also evidence a tendency to crack in a relatively short time or do not exhibit the required mechanical performance, also under the influence of elevated temperatures.

DE 2 311 239 describes an adjuvant composition for improving the setting and hardening properties of aluminous cement and mortar, comprising Lithia, a water-soluble lithium salt and a hydroxylated organic acid, or a salt or ester thereof. Said fluid is incorporated directly into the aluminous cement or into mortars and concretes during their manufacture or may be added to the mixing water during application. However, a disadvantage of this system lies within the fact that the cement composition as well as the activator composition cannot be stored for a sufficient time in order to be ready-for-use and hence have to be freshly prepared before use depending on desired setting and hardening times implying more procedural steps before application.

Therefore, there is a need for a ready-for-use multiple-component system, preferably a two-component system, which is superior over the prior art systems with regard to environmental aspects, health and safety, handling, storage time and a good balance between setting and hardening of the mortar. Moreover, it is of interest to provide a system that can be used for chemical fastening of anchoring means in mineral surfaces without adversely affecting the handling, characteristics and the mechanical performance of the chemical anchoring system.

In view of the above, it is an object of the present invention to provide a multiple-component system, in particular a two-component mortar system, which overcomes the disadvantages of the prior art systems. In particular, it is an object to provide a two-component mortar system that is ready-for-use, which can be handled easily and is eco-friendly, which can be stably stored for a certain period of time prior to use, which exhibits a good balance between setting and hardening and still has an excellent mechanical performance when it comes to chemically fastening anchoring means, even under the influence of elevated temperatures.

Moreover, it is an object of the present invention to provide a two-component mortar system that can be used for chemical fastening of anchoring means, preferably of metal elements, in mineral surfaces, such as structures made of brickwork, concrete, pervious concrete or natural stone.

These and other objectives as they will become apparent from the ensuring description of the invention are solved by the present invention as described. The description also pertains to preferred embodiments.

SUMMARY OF THE INVENTION

In one aspect, the present invention provides a ready-for-use two-component mortar system comprising a curable aqueous-phase aluminous cement component A and an initiator component B in aqueous-phase for initiating the curing process, component A further comprising at least one blocking agent selected from the group consisting of phosphoric acid, metaphosphoric acid, phosphorous acid and phosphonic acids, at least one plasticizer and water, and component B comprising an initiator, at least one retarder, at least one mineral filler and water. In particular, component B comprises an initiator comprising a mixture of alkali and/or alkaline earth metal salts, at least one retarder selected from the group consisting of citric acid, tartaric acid, lactic acid, salicylic acid, gluconic acid and mixtures thereof, and at least one mineral filler selected from the group consisting of limestone fillers, sand, corundum, dolomite, alkaline-resistant glass, crushed stones, gravels, pebbles and mixtures thereof.

In another aspect, the present invention provides a two-component mortar system that is used for chemical fastening of anchoring means, preferably of metal elements, in mineral surfaces, such as structures made of brickwork, concrete, pervious concrete or natural stone.

DETAILED DESCRIPTION OF THE INVENTION

The following terms and definitions will be used in the context of the present invention:

As used in the context of present invention, the singular forms of "a" and "an" also include the respective plurals unless the context clearly dictates otherwise. Thus, the term "a" or "an" is intended to mean "one or more" or "at least one", unless indicated otherwise.

The term "aluminous cement" in the context of the present invention refers to a calcium aluminate cement that consists predominantly of hydraulic active calcium aluminates. Alternative names are "high-alumina cement" or "Ciment fondu" in French. The main active constituent of calcium aluminate cements is monocalcium aluminate ($CaAl_2O_4$, $CaO \cdot Al_2O_3$, or CA in the cement chemist notation).

The term "shelf life" in the context of the present invention refers to the time during which a component stays in the form of a more or less fluid aqueous suspension of solid products, capable of coming back to the aqueous-suspension by mechanical means, without setting or losing its reactivity.

The term "initiator" in the context of the present invention refers to a compound or composition that modifies the chemical environment to start a particular chemical reaction. In the present invention the initiator modifies the pH-value of the mortar suspension thereby de-blocking the hydraulic binder in the final mixture.

The term "retarder" in the context of the present invention refers to a compound or composition that modifies the chemical environment to delay a particular chemical reaction. In the present invention the retarder modifies the hydration ability of the calcium aluminate cement of the mortar suspension thereby delaying the hydraulic binder action in the final mixture.

The term "initial set-time" in the context of the present invention refers to the time at which the mixture of component A and component B starts to set after mixing. During the time period after mixing, the mixture stays in the form of a more or less fluid aqueous suspension or paste of solid products.

The present invention pertains to a two-component mortar system for chemical fastening of anchoring means in mineral surfaces, comprising a curable aqueous-phase aluminous cement component A and an initiator component B in aqueous-phase for initiating the curing process. In particular, according to the present invention, component A further comprises at least one blocking agent selected from the group consisting of phosphoric acid, metaphosphoric acid, phosphorous acid and phosphonic acids, at least one plasticizer and water, and component B comprises an initiator, at least one retarder, at least one mineral filler and water, wherein the initiator comprises a mixture of alkali and/or alkaline earth metal salts, the at least one retarder is selected from the group consisting of citric acid, tartaric acid, lactic acid, salicylic acid, gluconic acid and mixtures thereof, and the mineral filler is selected from the group consisting of limestone fillers, sand, corundum, dolomite, alkaline-resistant glass, crushed stones, gravels, pebbles and mixtures thereof.

Component A according to the present invention is based on an aqueous-phase aluminous cement (CA) or an aqueous-phase calcium sulfoaluminate cement (CAS). The calcium aluminate cement which can be used in the present invention is characterized by rapid set and rapid hardening, rapid drying and shrinkage compensation when mixed with calcium sulfates, excellent resistance to corrosion and shrinkage. Such a calcium aluminate cement suitable to be used in the present invention is for example Ternal® White (Kemeos, France).

If component A comprises a mixture of aluminous cement (CAC) and calcium sulfate ($CaSO_4$), rapid ettringite formation takes place during hydration. In concrete chemistry hexacalcium aluminate trisulfate hydrate, represented by the general formula $(CaO)_6(Al_2O_3)(SO_3)_3 \cdot 32\ H_2O$ or $(CaO)_3(Al_2O_3)(CaSO_4)_3 \cdot 32H_2O$, is formed by the reaction of calcium aluminate with calcium sulfate, resulting in quick setting and hardening as well as in shrinkage compensation or even expansion. With moderate increase of the sulfate content shrinkage compensation can be achieved.

Component A of the present invention comprises at least about 40 wt.-%, preferably at least about 50 wt.-%, more preferably at least about 60 wt.-%, most preferably at least about 70 wt.-%, from about 40 wt.-% to about 95 wt.-%, preferably from about 50 wt.-% to about 85 wt.-%, more preferably from about 60 wt.-% to about 80 wt.-%, most preferably from about 70 wt.-% to about 75 wt.-% of aluminous cement, based on the total weight of component A.

According to an alternative embodiment of the invention, component A comprises at least about 20 wt.-%, preferably at least about 30 wt.-%, more preferably at least about 40 wt.-%, most preferably at least about 50 wt.-%, from about 20 wt.-% to about 80 wt.-%, preferably from about 30 wt.-% to about 70 wt.-%, more preferably from about 35 wt.-% to about 60 wt.-%, most preferably from about 40 wt.-% to about 55 wt.-% of aluminous cement, based on the total weight of component A and at least about 5 wt.-%, preferably at least about 10 wt.-%, more preferably at least about 15 wt.-%, most preferably at least about 20 wt.-%, from about 1 wt.-% to about 50 wt.-%, preferably from about 5 wt.-% to about 40 wt.-%, more preferably from about 10 wt.-% to about 30 wt.-%, most preferably from about 15 wt.-% to about 25 wt.-% of calcium sulfate, preferably calcium sulfate hemihydrate, based on the total weight of component A. In a preferred alternative embodiment of the two-component mortar system of the present invention, the ratio of $CaSO_4$/CAC of component A should be less or equal to 35:65.

The blocking agent comprised in component A according to the present invention is selected from the group consisting of phosphoric acid, metaphosphoric acid, phosphorous acid and phosphonic acids, preferably is phosphoric acid or metaphosphoric acid, most preferably is phosphoric acid, in particular an 85% aqueous solution of phosphoric acid. Component A comprises at least about 0.1 wt.-%, preferably at least about 0.3 wt.-%, more preferably at least about 0.4 wt.-%, most preferably at least about 0.5 wt.-%, from about 0.1 wt.-% to about 20 wt.-%, preferably from about 0.1 wt.-% to about 15 wt.-%, more preferably from about 0.1 wt.-% to about 10 wt.-%, most preferably from about 0.3 wt.-% to about 10 wt.-% of said blocking agent, based on the total weight of component A. In a preferred embodiment, component A comprises from about 0.3 wt.-% to about 10 wt.-% of 85% aqueous solution of phosphoric acid, based on the total weight of component A. Preferably, the amounts of aluminous cement and/or calcium sulfoaluminate cement by weight relative to the hydraulic binder total weight are higher than any of the following values: 50%, 60%, 70%, 80%, 90%, 95%, 99% or are 100%.

The plasticizer comprised in component A according to the present invention is selected from the group consisting of low molecular weight (LMW) polyacrylic acid polymers, superplasticizers from the family of polyphosphonate polyox and polycarbonate polyox, and ethacryl superplasticizers from the polycarboxylate ether group, and mixtures thereof, for example Ethacryl™ G (Coatex, Arkema Group, France), Acumer™ 1051 (Rohm and Haas, U.K.), or Sika® ViscoCrete®-20 HE (Sika, Germany). Suitable plasticizers are commercially available products. Component A comprises at least about 0.2 wt.-%, preferably at least about 0.3 wt.-%, more preferably at least about 0.4 wt.-%, most preferably at least about 0.5 wt.-%, from about 0.2 wt.-% to about 20 wt.-%, preferably from about 0.3 wt.-% to about 15 wt.-%, more preferably from about 0.4 wt.-% to about 10 wt.-%, most preferably from about 0.5 wt.-% to about 5 wt.-% of said plasticizer, based on the total weight of component A.

In an advantageous embodiment, component A further comprises the following characteristics, taken alone or in combination.

Component A may additionally comprise a thickening agent. The thickening agents which can be used in the present invention may be selected from the group consisting of organic products, such as xanthan gum, welan gum or DIUTAN® gum (CPKelko, USA), starched-derived ethers, guar-derived ethers, polyacrylamide, carrageenan, agar agar, and mineral products, such as clay, and their mixtures. Suitable thickening agents are commercially available products. Component A comprises at least about 0.01 wt.-%, preferably at least about 0.1 wt.-%, more preferably at least about 0.2 wt.-%, most preferably at least about 0.3 wt.-%, from about 0.01 wt.-% to about 10 wt.-%, preferably from about 0.1 wt.-% to about 5 wt.-%, more preferably from about 0.2 wt.-% to about 1 wt.-%, most preferably from about 0.3 wt.-% to about 0.7 wt.-% of said thickening agent, based on the total weight of component A.

Component A may further comprise an antibacterial or biocidal agent. The antibacterial or biocidal agents which can be used in the present invention may be selected from the group consisting of compounds of the isothiazolinone family, such as methylisothiazolinone (MIT), octylisothiazolinone (OIT) and benzoisothiazolinone (BIT) and their mixtures. Suitable antibacterial or biocidal agents are commercially available products. Exemplarily mentioned are Ecocide K35R (Progiven, France) and Nuosept OB 03 (Ashland, The Netherlands). Component A comprises at least about 0.001 wt.-%, preferably at least about 0.005 wt.-%, more preferably at least about 0.01 wt.-%, most preferably at least about 0.015 wt.-%, from about 0.001 wt.-% to about 1.5 wt.-%, preferably from about 0.005 wt.-% to about 0.1 wt.-%, more preferably from about 0.01 wt.-% to about 0.075 wt.-%, most preferably from about 0.015 wt.-% to about 0.03 wt.-% of said antibacterial or biocidal agent, based on the total weight of component A. In a preferred embodiment, component A comprises from about 0.015 wt.-% to about 0.03 wt.-% of Nuosept OB 03, based on the total weight of component A.

In an alternative embodiment, component A comprises at least one filler, in particular an organic or mineral filler. The filler which can be used in the present invention may be selected from the group consisting of quartz powder, preferably quartz powder having an averaged grain size (d50%) of about 16 µm, quartz sand, clay, fly ash, fumed silica, carbonate compounds, pigments, titanium oxides, light fillers, and their mixtures. Suitable mineral fillers are commercially available products. Exemplarily mentioned is quartz powder Millisil W12 or W6 (Quarzwerke GmbH, Germany). Component A comprises at least about 1 wt.-%, preferably at least about 2 wt.-%, more preferably at least about 5 wt.-%, most preferably at least about 8 wt.-%, from about 1 wt.-% to about 50 wt.-%, preferably from about 2 wt.-% to about 40 wt.-%, more preferably from about 5 wt.-% to about 30 wt.-%, most preferably from about 8 wt.-% to about 20 wt.-% of said at least one filler, based on the total weight of component A.

The water content comprised in component A is at least about 1 wt.-%, preferably at least about 5 wt.-%, more preferably at least about 10 wt.-%, most preferably at least about 20 wt.-%, from about 1 wt.-% to about 50 wt.-%, preferably from about 5 wt.-% to about 40 wt.-%, more preferably from about 10 wt.-% to about 30 wt. %, most preferably from about 15 wt.-% to about 25 wt.-%, based on the total weight of component A.

The presence of a plasticizer, thickening agent as well as an antibacterial or biocidal agent does not change the overall inorganic nature of the cementitious component A.

Component A comprising the aluminous cement or calcium sulfoaluminate cement is present in aqueous-phase, preferably in form of a slurry or paste.

Component B of the present invention comprises an initiator, at least one retarder, at least one mineral filler and water. To ensure a sufficient processing time, whereby the initial-set time is at least 5 min or more, at least one retarder, which prevents premature hardening of the mortar composition, is used in a distinct concentration in addition to the initiator component.

The initiator present in component B is comprised of an activator component and an accelerator component which comprise a mixture of alkali and/or alkaline earth metal salts.

In particular, the activator component is constituted of at least one alkali and/or alkaline earth metal salt selected from the group consisting of hydroxides, chlorides, sulfates, phosphates, monohydrogen phosphates, dihydrogen phosphates, nitrates, carbonates and mixtures thereof, preferably the activator component is an alkali or alkaline earth metal salt, more preferably is a calcium metal salt, such as calcium hydroxide, calcium sulfate, calcium carbonate or calcium phosphate, a sodium metal salt, such as sodium hydroxide, sodium sulfate, sodium carbonate or sodium phosphate, or a lithium metal salt, such as lithium hydroxide, lithium sulfate, lithium carbonate or lithium phosphate, most preferably is lithium hydroxide. In one preferred embodiment the lithium hydroxide used in component B is a 10% aqueous solution of lithium hydroxide.

Component B comprises at least about 0.01 wt.-%, preferably at least about 0.02 wt.-%, more preferably at least about 0.05 wt.-%, most preferably at least about 1 wt.-%, from about 0.01 wt.-% to about 40 wt.-%, preferably from about 0.02 wt.-% to about 35 wt.-%, more preferably from about 0.05 wt.-% to about 30 wt.-%, most preferably from about 1 wt.-% to about 25 wt.-% of said activator, based on the total weight of component B. In a particular preferred embodiment, the activator is comprised of water and lithium hydroxide. The water content comprised in component B is at least about 1 wt.-%, preferably at least about 5 wt.-%, more preferably at least about 10 wt.-%, most preferably at least about 20 wt.-%, from about 1 wt.-% to about 60 wt.-%, preferably from about 5 wt.-% to about 50 wt.-%, more preferably from about 10 wt.-% to about 40 wt.-%, most preferably from about 15 wt.-% to about 30 wt.-%, based on the total weight of component B. The lithium hydroxide content comprised in component B is at least about 0.1 wt.-%, preferably at least about 0.5 wt.-%, more preferably at least about 1.0 wt.-%, most preferably at least about 1.5 wt.-%, from about 0.1 wt.-% to about 5 wt.-%, preferably from about 0.5 wt.-% to about 4 wt.-%, more preferably from about 1.0 wt.-% to about 3 wt.-%, most preferably from about 1.5 wt.-% to about 2.5 wt.-%, based on the total weight of component B. In a most preferred embodiment, component B comprises from about 2.0 wt.-% to about 20 wt.-% of a 10% aqueous solution of lithium hydroxide, based on the total weight of component B.

The accelerator component is constituted of at least one alkali and/or earth alkaline metal salt selected from the group consisting of hydroxides, chlorides, sulfates, phosphates, monohydrogen phosphates, dihydrogen phosphates, nitrates, carbonates and mixtures thereof, preferably the accelerator component is an alkali or earth alkaline metal salt, still preferably is a water-soluble alkali or earth alkaline metal salt, more preferably is a calcium metal salt, such as calcium hydroxide, calcium sulfate, calcium carbonate, calcium chloride, calcium formate or calcium phosphate, a sodium metal salt, such as sodium hydroxide, sodium sulfate, sodium carbonate, sodium chloride, sodium formate or sodium phosphate, or a lithium metal salt, such as lithium hydroxide, lithium sulfate, lithium sulfate monohydrate, lithium carbonate, lithium chloride, lithium formate or lithium phosphate, most preferably is lithium sulfate or lithium sulfate monohydrate. Component B comprises at least about 0.01 wt.-%, preferably at least about 0.05 wt.-%, more preferably at least about 0.1 wt.-%, most preferably at least about 1.0 wt.-%, from about 0.01 wt.-% to about 25 wt.-%, preferably from about 0.05 wt.-% to about 20 wt.-%, more preferably from about 0.1 wt.-% to about 15 wt.-%, most preferably from about 1.0 wt.-% to about 10 wt.-% of said accelerator, based on the total weight of component B.

In a particular preferred embodiment of component B of the present invention, the ratio of 10% aqueous solution of lithium hydroxide/lithium sulfate or lithium sulfate monohydrate is 7/1 or 6/1.

The at least one retarder comprised in component B according to the present invention is selected from the group consisting of citric acid, tartaric acid, lactic acid, salicylic acid, gluconic acid and mixtures thereof, preferably is a mixture of citric acid and tartaric acid. Component B comprises at least about 0.1 wt.-%, preferably at least about 0.2 wt.-%, more preferably at least about 0.5 wt.-%, most preferably at least about 1.0 wt.-%, from about 0.1 wt.-% to about 25 wt.-%, preferably from about 0.2 wt.-% to about 15 wt.-%, more preferably from about 0.5 wt.-% to about 15 wt.-%, most preferably from about 1.0 wt.-% to about 10 wt.-% of said retarder, based on the total weight of component B.

In a particular preferred embodiment of component B of the present invention, the ratio of citric acid/tartaric acid is 1.6/1.

The at least one mineral filler comprised in component B according to the present invention is selected from the group consisting of limestone fillers, sand, crushed stones, gravels, pebbles and mixtures thereof, preferred are limestone fillers, such as various calcium carbonates. The at least one mineral filler is preferably selected from the group consisting of limestone fillers or quartz fillers, such as quartz powder Millisil W12 or W6 (Quarzwerke GmbH, Germany) and quartz sand. The at least one mineral filler of component B is most preferably a calcium carbonate or a mixture of calcium carbonates. Component B comprises at least about 30 wt.-%, preferably at least about 40 wt.-%, more preferably at least about 50 wt.-%, still more preferably at least about 60 wt.-%, most preferably at least about 70 wt.-%, from about 30 wt.-% to about 95 wt.-%, preferably from about 35 wt.-% to about 90 wt.-%, more preferably from about 40 wt.-% to about 85 wt.-%, still more preferably from about 45 wt.-% to about 80 wt.-%, most preferably from about 50 wt.-% to about 75 wt.-% of at least one mineral filler, based on the total weight of component B. The at least one mineral filler is chosen to obtain a particle size complementary to that of the aluminous cement.

It is preferred that the at least one mineral filler has an average particle size of not more than 500 μm, more preferably of not more than 400 μm, most preferably not more than 350 μm.

In a particular preferred embodiment of the present invention, the at least one mineral filler comprised in component B is mixture of three different calcium carbonates, i.e. calcium carbonate fines, such as different Omyacarb® types (Omya International AG, Germany). Most preferably, the first calcium carbonate has an average particle size (d50%) of about 3.2 μm and a residue of 0.05% on a 45 μm sieve (determined according to ISO 787/7). The second calcium carbonate has an average particle size (d50%) of about 7.3 μm and a residue of 0.5% on a 140 μm sieve (determined according to ISO 787/7). The third calcium carbonate has an average particle size (d50%) of about 83 μm and a residue of 1.0% on a 315 μm sieve (determined according to ISO 787/7). In a particular preferred embodiment of component B of the present invention, the ratio of first calcium carbonate/second calcium carbonate/third calcium carbonate is 1/1.5/2 or 1/1.4/2.2.

In a particular preferred alternative embodiment of the present invention, the at least one mineral filler comprised in component B is mixture of three different quartz fillers. Most preferably, the first quartz filler is a quartz sand having an average particle size (d50%) of about 240 μm. The second quartz filler is a quartz powder having an average grain size (d50%) of about 40 μm. The third quartz filler is a quartz powder having an average grain size (d50%) of about 15 μm. In a particular preferred embodiment of component B of the present invention, the ratio of first quartz filler/second quartz filler/third quartz filler is 3/2/1.

In an advantageous embodiment, component B further comprises the following characteristics, taken alone or in combination.

Component B may additionally comprise a thickening agent. The thickening agent to be used in the present invention may be selected from the group consisting of bentonite, silicon dioxide, quartz, thickening agents based on acrylate, such as alkali-soluble or alkali-swellable emulsions, fumed silica, clay and titanate chelating agents. Exemplarily mentioned are polyvinyl alcohol (PVA), hydrophobically modified alkali soluble emulsions (HASE), hydrophobically modified ethylene oxide urethane polymers known in the art as HEUR, and cellulosic thickeners such as hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, 2-hydoxypropyl cellulose, attapulgite clay, and mixtures thereof. Suitable thickening agents are commercially available products, such as Optigel WX (BYK-Chemie GmbH, Germany), Rheolate 1 (Elementis GmbH, Germany) and Acrysol ASE-60 (The Dow Chemical Company). Component B comprises at least about 0.01 wt.-%, preferably at least about 0.05 wt.-%, more preferably at least about 0.1 wt.-%, most preferably at least about 0.3 wt.-%, from about 0.01 wt.-% to about 15 wt.-%, preferably from about 0.05 wt.-% to about 10 wt.-%, more preferably from about 0.1 wt.-% to about 5 wt.-%, most preferably from about 0.3 wt.-% to about 1 wt.-% of said thickening agent, based on the total weight of component B.

The presence of a retarder and thickening agent does not change the overall inorganic nature of the cementitious component B.

Component B comprising the initiator and retarder is present in aqueous-phase, preferably in form of a slurry or paste.

It is preferred that the pH-value of component B is above 10, more preferably above 11 and most preferably is above 12, in particular in the range between 10 and 14, preferably between 11 and 13.

It is particular preferred that the proportions of water in the two components, namely component A and component B, are chosen so that the water to aluminous cement ratio (W/CAC) or water to calcium sulfoaluminate cement (W/CAS), in the product obtained by mixing components A and B is lower than 1.5, preferably between 0.3 and 1.2, most preferably between 0.4 and 1.0.

Moreover, it is particular preferred that the proportion of lithium in component B is chosen so that the lithium to aluminous cement ratio (Li/CAC) and lithium to calcium sulfoaluminate cement (Li/CAS), in the product obtained by mixing components A and B is lower than 0.05, preferably between 0.001 and 0.05, most preferably between 0.005 and 0.01.

Moreover, it is particular preferred that the proportion of retarder in component B is chosen so that the citric acid/tartaric acid to aluminous cement ratio and citric acid/tartaric acid to calcium sulfoaluminate cement, in the product obtained by mixing components A and B is lower than 0.5, preferably between 0.01 and 0.4, most preferably between 0.1 and 0.2.

In a most preferred embodiment, component A comprises or consists of the following components:
  70 to 80 wt.-% of aluminous cement, alternatively 40 to 60 wt.-% aluminous cement and
  15 to 25 wt.-% calcium sulfate,
  0.5 to 1.5 wt.-% of phosphoric acid,
  0.5 to 1.5 wt.-% of plasticizer,
  0.001 to 0.05 wt.-% of an antimicrobial or biocidal agent,
  optionally 5 to 20 wt.-% of mineral fillers, and
  15 to 25 wt.-% of water.

In a preferred embodiment, component B comprises or consists of the following components:
  0.1 wt.-% to 4 wt.-% of lithium hydroxide,
  0.1 wt.-% to 5 wt.-% of lithium sulfate or lithium sulfate monohydrate,
  0.05 wt.-% to 5 wt.-% of citric acid,
  0.05 wt.-% to 4 wt.-% of tartaric acid,
  35 wt.-% to 45 wt.-% of a first mineral filler,
  15 wt.-% to 25 wt.-% of a second mineral filler,
  10 wt.-% to 20 wt.-% of a third mineral filler,
  0.01 wt.-% to 0.5 wt.-% of a thickening agent, and
  15 wt.-% to 25 wt.-% of water.

In a most preferred embodiment, component B comprises or consists of the following components:
  1.5 wt.-% to 2.5 wt.-% of lithium hydroxide,
  1 wt.-% to 4 wt.-% of lithium sulfate or lithium sulfate monohydrate,
  1 wt.-% to 3 wt.-% of citric acid,
  0.5 wt.-% to 2 wt.-% of tartaric acid,
  35 wt.-% to 45 wt.-% of a first mineral filler,
  15 wt.-% to 25 wt.-% of a second mineral filler,
  10 wt.-% to 20 wt.-% of a third mineral filler,
  0.01 wt.-% to 0.5 wt.-% of a thickening agent, and
  15 wt.-% to 25 wt.-% of water.

In a most preferred alternative embodiment, component B comprises or consists of the following components:
  3 wt.-% to 4 wt.-% of lithium hydroxide,
  1 wt.-% to 10 wt.-% of lithium sulfate or lithium sulfate monohydrate,
  1 wt.-% to 5 wt.-% of citric acid,
  1 wt.-% to 3 wt.-% of tartaric acid,
  25 wt.-% to 35 wt.-% of a first mineral filler,
  15 wt.-% to 25 wt.-% of a second mineral filler,
  10 wt.-% to 20 wt.-% of a third mineral filler,
  0.01 wt.-% to 0.5 wt.-% of a thickening agent, and
  30 wt.-% to 40 wt.-% of water.

In another most preferred embodiment, component B comprises or consists of the following components:
  0.2 wt.-% to 1.5 wt.-% of lithium hydroxide,
  0.1 wt.-% to 1.0 wt.-% of lithium sulfate or lithium sulfate monohydrate,
  0.1 wt.-% to 1.0 wt.-% of citric acid,
  0.1 wt.-% to 0.5 wt.-% of tartaric acid,
  35 wt.-% to 45 wt.-% of a first mineral filler,
  15 wt.-% to 25 wt.-% of a second mineral filler,
  10 wt.-% to 20 wt.-% of a third mineral filler,
  0.01 wt.-% to 0.5 wt.-% of a thickening agent, and
  15 wt.-% to 25 wt.-% of water.

Component A of the present invention may be prepared as follows: The phosphor-containing blocking agent is mixed with water, so that the pH-value of the resulting mixture is about 2. Plasticizer is added and the mixture homogenized. Aluminous cement, optionally calcium sulfate, and optionally mineral filler are premixed and added stepwise to the mixture whilst increasing the stirring speed, so that the pH-value of the resulting mixture is about 4. Finally, thickening agent and antibacterial/biocidal agent are added and mixed until complete homogenization of the mixture.

Component B of the present invention may be prepared as follows: The accelerator is dissolved in an aqueous solution of an activator, followed by subsequent addition of retarder and homogenization of the mixture. The filler(s) is/are added stepwise whilst increasing the stirring speed until the mixture homogenizes. Finally, the thickening agent is added until complete homogenization of the mixture.

Component A and B are present in aqueous phase, preferably in form of a slurry or paste. In particular, components A and B have a pasty to fluid aspect according to their respective compositions. In one preferred embodiment, component A and component B are in paste form thereby preventing sagging at the time of mixing the two components.

The weight ratio between component A and component B (A/B) is preferentially comprised between 7/1 and 1/3, preferably is 3/1. Preferably, the composition of the mixture comprises 75 wt.-% of component A and 25 wt.-% of component B. In an alternative embodiment, the composition of the mixture comprises 25 wt.-% of component A and 75 wt.-% of component B.

The two-component system is of mineral nature, which is not affected by the presences of additional thickening agents of other agents.

The shelf life of the two-component system depends on the individual shelf life of each of the respective components, in particular component A as well as component B has a shelf life of at least six months at ambient temperature so as to protect the system from the storing and supply delays. Most preferably, component A and B are individually stable for at least six months. The component A and B were stored in tightly closed containers to avoid evaporation of water at 40° C. and checked for any changes in fluidity, homogeneity, whether sedimentation occurs, and pH-value after several time intervals. The properties of all components remained unaffected after 6 months, thus the shelf life is at least 6 months at 40° C.

It is preferred that the two-component mortar system has an initial set-time of at least 5 min, preferably of at least 10 min, more preferably of at least 15 min, most preferably of at least 20 min, in particular in the range of from about 5 to 25 min, preferably in the range of about 10 to 20 min, after mixing of the two components A and B.

In the multi-component mortar system, especially two-component mortar system, the volume ratio of cementitious component A to initiator component B is 1:1 to 7:1, preferably is 3:1. In an alternative embodiment, the volume ratio of cementitious component A to initiator component B is 1:3 to 1:2.

After being produced separately, component A and component B are introduced into separate containers, from which they are ejected by means of mechanical devices and are guided through a mixing device. The two-component mortar system of the present invention is preferably a ready-for-use system, whereby component A and B are separately arranged from each other in a multi-chamber device, such as a multi-chamber cartridge and/or a multi-chamber cylinder or in two-component capsules, preferably in a two-chamber cartridge or in two-component capsules. The multi-chamber system preferably includes two or more foil bags for separating curable component A and initiator component B. The contents of the chambers or bags which are mixed together by a mixing device, preferably via a static mixer, can be injected into a borehole. The assembly in multiple chamber cartridges or pails or sets of buckets is also possible.

The hardening aluminous cement composition existing from the static mixer is inserted directly into the borehole, which is required accordingly for fastening the anchoring means, and has been initially introduced into the mineral surface, during the chemical fastening of anchoring means, whereupon the construction element to be fastened, for example an anchor rod, is inserted and adjusted, whereupon the mortar composition sets and hardens. In particular, the two-component system of the present invention is to be considered as a chemical anchor for fastening metal elements.

Without being bound by theory, the blocking agent present in component A inhibits the solubilization of the calcium aluminate(s) in water, thereby stopping cement hydration which leads to the curing of the mixture. Upon adding the initiator component B, the pH-value is changed and the cementitious component A is unblocked and hydration reaction of the calcium aluminate(s) is released. As this hydration reaction is catalyzed and accelerated by the presence of alkali metals salts, in particular lithium salts, it has an initial set-time of shorter than 5 min. In order to retard the fast curing time (initial-set time), it is preferred that the at least one retarder comprised in component B according to the present invention is so chosen to obtain an initial set-time of at least 5 min, preferably of at least 10 min, more preferably of at least 15 min, most preferably of at least 20 min, in particular in the range of from about 5 to 25 min, preferably in the range of about 10 to 20 min, after mixing of the two components A and B.

The role of mineral fillers, in particular in component B, is to adjust the final performance with regard to mechanical strength and performance as well as long term durability. By optimizing the fillers, it is possible to optimize the water/aluminous cement ratio which allows for an efficient and fast hydration of the aluminous cement.

The two-component mortar system of the present invention can be used for chemical fastening of anchoring means, preferably of metal elements, such as anchor rods, in particular threaded rods, bolts, steel reinforcement bars or the like into mineral surfaces, such as structures made of brickwork, concrete, pervious concrete or natural stone. In particular, the two-component mortar system of the present invention can be used for chemical fastening of anchoring means, such as metal elements, in boreholes. It can be used for anchoring purposes encompassing an increase in the load capacity at temperatures above room temperature or at elevated temperatures, such as above 80° C., and/or encompassing an increase in the bond stress in the cured state. An increased temperature resistance results in a better operational capability for anchoring purposes also at higher temperatures, such as temperatures being present in the area of a borehole of facade anchorages, which are exposed to strong sunlight or otherwise elevated temperatures.

Moreover, the two-component mortar system of the present invention may be used for the attachment of fibers, scrims, fabrics or composites, in particular of high-modulus fibers, preferably of carbon fibers, in particular for the reinforcement of building structures, for example walls or ceilings or floors, or further for mounting components, such as plates or blocks, e.g. made of stone, glass or plastic, on buildings or structural elements. However, in particular it is used for fastening of anchoring means, preferably metal elements, such as anchor rods, in particular threaded rods, bolts, steel reinforcement bars or the like into recesses, such as boreholes, in mineral surfaces, such as structures made of brickwork, concrete, pervious concrete or natural stone, whereby the components of the two-component mortar system of the present invention are prior mixed, for example by means of a static mixer or by destroying a cartridge or a plastic bag, or by mixing components of a multi-chamber pails or sets of buckets.

The following example illustrates the invention without thereby limiting it.

EXAMPLES

1. Preparation of Component A and Component B

The cementitious component A as well as the initiator component B of the comparative example 1 and of inventive examples 2 to 4 are initially produced by mixing the constituents specified in Tables 1 and 2, respectively. The proportions that are given are expressed in wt.-%.

A typical mixing protocol for component A is as follows: weighting out the necessary quantity of water, introducing the water into a mixing bowl and slowly adding phosphoric acid thereto under stirring until a pH-value of about 2 is obtained; adding plasticizer and homogenizing at 100 to 200 rpm for 2 minutes; pre-mixing Ternal White® and filler in a big bucket and adding this mixture step by step whilst slowly stirring at 200 rpm to avoid lump formation, increasing stirring speed to 4000 rpm; pH-value obtained should be about 4; adding slowly thickening agent and finally antibacterial or biocidal agent and homogenizing at 5000 rpm it for 5 min.

TABLE 1

Composition of component A.

| | | Examples | | |
|---|---|---|---|---|
| Compound | Function | A1 | A2 | A3 |
| Deionized water | | 19.78 | 19.98 | 20.00 |
| Phosphoric acid 85% | blocking agent | 0.90 | 0.91 | 0.9 |
| Ternal White | aluminate cement | 70.00 | 77.80 | 40.50 |
| CaSO$_4$ hemihydrate | ettringite former | — | — | 17.3 |
| Millisil W12 | filler | 8.00 | — | 20.00 |
| Acumer ™ 1051 | plasticizer | 1.00 | 1.01 | 1.00 |
| Xanthan Gum | thickening agent | 0.30 | 0.30 | 0.30 |
| Nuosept OB 03 | biocidal agent | 0.02 | 0.02 | 0.02 |

Phosphoric acid 85% marketed by Sigma-Aldrich Chemie GmbH, Germany
Ternal White ® marketed by Kerneos S.A., France
CaSO$_4$ hemihydrate, Prestia Selects marketed by Lafarge Platres, France
Millisil W12 marketed by Quarzwerke Frechen, Germany
Acumer ™ 1051 marketed by Rohm and Haas Europe, U.K.
Xanthan Gum marketed by Colltec GmbH & CO. KG, Germany
Nuosept OB 03 marketed by Ashland Nederland B.V., The Netherlands A typical mixing protocol for component B is as follows: dissolving lithium sulfate in a 10% aqueous solution of lithium hydroxide followed by dissolving the carboxylic acids in this mixture and fully homogenizing it at 500 rpm for at least for 30 min; adding stepwise filler or filler mixture while increasing stirring speed to 2000 rpm over a time period of 5 min and continuing homogenizing it at 2000 rpm for about 10 min; finally adding thickening agent whilst stirring, and increasing stirring speed to 2500 rpm over a time period of 3 min; finally continuing homogenizing for 5 min.

TABLE 2

Composition of component B.

| | | Comparative Example | Inventive Examples | | |
|---|---|---|---|---|---|
| Compound | Function | B1 | B2 | B3 | B4 |
| LiOH 10% (water) | activator | 20.14 | 19.59 | 33.54 | 19.60 |
| Li$_2$SO$_4$ | accelerator | 2.37 | 2.66 | 4.57 | 2.66 |
| Citric acid | retarder | — | 1.64 | 2.81 | 1.64 |
| Tartaric acid | retarder | — | 1.02 | 1.75 | 1.02 |
| Filler 1 | filler | 36.77[1] | 35.78[1] | 27.22[1] | 44.93[4] |
| Filler 2 | filler | 23.26[2] | 22.53[2] | 17.14[2] | 19.47[5] |
| Filler 3 | filler | 17.00[3] | 16.54[3] | 12.58[3] | 10.48[6] |
| Optigel WX | thickening agent | 0.20 | 0.20 | 0.35 | 0.20 |

LiOH 10% (water) marketed by Bern Kraft GmbH, Germany
Li$_2$SO$_4$ marketed by Sigma-Aldrich Chemie GmbH, Germany
Citric acid marketed by Sigma-Aldrich Chemie GmbH, Germany
Tartaric acid marketed by Sigma-Aldrich Chemie GmbH, Germany
[1]Omyacarb 130-Al marketed by Omya International AG, Germany
[2]Omyacarb 15-H Al marketed by Omya International AG, Germany
[3]Omyacarb 2-Al marketed by Omya International AG, Germany
[4]Quarzsand F32 marketed by Quarzwerke GmbH, Germany
[5]Millisil W6 marketed by Quarzwerke GmbH, Germany
[6]Millisil W12 marketed by Quarzwerke GmbH, Germany
Optigel WX marketed by Rockwood Clay Additives GmbH, Germany 2. Determination of Mechanical Performance After being produced separately, the cementitious component A and initiator component B are mixed in a speed mixer in a volume ratio of 3:1 and are introduced into a prepared borehole in concrete C20/25 having a diameter of 14 or 16 mm. The borehole was created by hammer drilling or diamond coring.

Load values of the cured mortar composition are determined by introducing an M12 threaded anchor rod, having an anchoring depth of 72 or 60 mm, into a borehole, having a diameter of 14 or 16 mm, in differently conditioned concrete C20/25 (Table 3).

TABLE 3

Condition of concrete C20/25 tested.

| Sample number | Concrete condition | Borehole diameter in mm |
|---|---|---|
| 1 | dry concrete, dust completely removed, room temperature | 14, hammer drilling |
| 2 | water-saturated concrete, dust 50% removed, room temperature | 14, hammer drilling |
| 3 | dry concrete, dust 50% removed, room temperature | 14, hammer drilling |
| 4 | water-saturated concrete, dust completely removed, room temperature | 14, hammer drilling |
| 5 | dry concrete, dust completely removed, room temperature | 16, hammer drilling |
| 6 | dry concrete, dust completely removed, installation, curing and pull-out at −5° C. | 14, hammer drilling |
| 7 | dry concrete, dust completely removed, installation, curing and pull-out at 5° C. | 14, hammer drilling |
| 8 | dry concrete, dust completely removed, installation, curing and pull-out at 40° C. | 14, hammer drilling |
| 9 | dry concrete, dust completely removed, after 24 h heating up to 80° C., after 24 h pull-out at 80° C. | 14, hammer drilling |
| 10 | dry concrete, dust completely removed, after 24 h heating up to 120° C., after 24 h pull-out at 120° C. | 14, hammer drilling |
| 11 | dry concrete, dust completely removed, after 3 d heating up to 250° C., after 3 d pull-out at 250° C. | short reinforcement bar with embedment depth 60 mm |

TABLE 3-continued

Condition of concrete C20/25 tested.

| Sample number | Concrete condition | Borehole diameter in mm |
|---|---|---|
| 12 | wet borehole, room temperature, fully cleaned borehole | 14, diamond coring with water flushing |
| 13 | wet borehole, room temperature, half cleaned borehole | 14, diamond coring with water flushing |
| 14 | dry concrete, dust completely removed, room temperature | short reinforcement bar with embedment depth 60 mm |

The average failure load is determined by centrally pulling out the threaded anchor rod with tight support using high-strength steel rods using a hydraulic tool. Three threaded anchor rods are doweled in place in each case and their load values are determined after curing for 24 hours as mean value. Ultimate failure loads are calculated as bond strengths and given in $N/mm^2$ in Table 4.

TABLE 4

Bond strengths in $N/mm^2$.

| | Comparative Example | Inventive Examples (mixture of component A and B) | | | | |
|---|---|---|---|---|---|---|
| | | Example No. | | | | |
| Sample number | 1<br>A2 + B1 | 2<br>A1 + B2 | 3<br>A2 + B2 | 4<br>A3 + B3 | 5<br>A2 + B4 | 6<br>A1 + B4 |
| 1 | c.n.b.d. | 14.6 | 14.6 | 11.2 | 15.4 | 13.9 |
| 2 | c.n.b.d. | 12.3 | 13.7 | 16.5 | 12.8 | n.d. |
| 3 | c.n.b.d. | 13.1 | 13.5 | 10.4 | 11.8 | n.d. |
| 4 | c.n.b.d. | 13.1 | 13.7 | 16.4 | 13.2 | n.d. |
| 5 | c.n.b.d. | n.d. | 11.2 | 9.0 | n.d. | n.d. |
| 6 | c.n.b.d. | n.d. | 9.7 | 4.4 | n.d. | n.d. |
| 7 | c.n.b.d. | n.d. | 13.1 | 12.0 | n.d. | n.d. |
| 8 | c.n.b.d. | n.d. | 14.0 | 13.8 | n.d. | n.d. |
| 9 | c.n.b.d. | n.d. | 21.3 | 20.2 | n.d. | n.d. |
| 10 | c.n.b.d. | n.d. | 21.6 | 21.4 | n.d. | n.d. |
| 11 | c.n.b.d. | 9.5 | 9.7 | n.d. | n.d. | n.d. |
| 12 | c.n.b.d. | n.d. | 11.9 | 13.7 | n.d. | n.d. |
| 13 | c.n.b.d. | n.d. | 10.0 | 16.3 | n.d. | n.d. |
| 14 | c.n.b.d. | 8.9 | 8.9 | 7.0 | n.d. | n.d. | c.n.b.d. = could not be determined
n.d. = not determined

As it can be seen from Table 4, all inventive systems show considerable bond strengths after 24 hours of curing, especially the mechanical performance at elevated temperatures. Comparative system not containing any organic acid, had an initial set time of less than 5 min and could neither be introduced into any borehole nor a metal element could be anchored into it, due to an insufficient handling time. Further, in comparison to injection mortars based on organic resins, their bond strength at elevated temperatures show significant, non-acceptable decrease in load values, at 250° C. sometimes close to zero in the organic systems, whereas the inventive examples increase in their bond strengths. Moreover, the ettringite type slurry shows particular good performance in presence of water, and in diamond drilled holes.

3. Determination of Mechanical Performance Depending on Curing Times

Component A1 and A2, respectively, were mixed with B1 and B2, respectively, in a ratio of 3:1 and cured with reinforcement bars with an embedment depth of 60 mm in 14 mm boreholes (dust completely removed) in dry concrete C20/25, and pulled using a hydraulic tool after different time intervals at room temperature.

TABLE 5

Bond strengths in $N/mm^2$.

| | Time interval | | | | |
|---|---|---|---|---|---|
| Example No. | 24 hours | 4 days | 1 week | 2 weeks | 4 weeks |
| 1 (comparative) | c.n.b.d. | c.n.b.d. | c.n.b.d. | c.n.b.d. | c.n.b.d. |
| 2 (inventive) | 6.9 | 7.3 | 8.1 | 10.0 | 12.2 |
| 3 (inventive) | 7.4 | 8.1 | 8.3 | 10.5 | 12.1 |

As it can be seen from Table 5, there is a pronounced post-cure effect; the initial values are almost doubled after one month.

As it has been shown above, the two-component mortar system of the present invention provides curing rates and mechanical strength comparable to those of the organic systems, but the essentially mineral composition thereof makes it far less toxic and very little polluting for the environment as well as allows for a more cost-effective production than of the known system of the prior art.

The invention claimed is:
1. A process for fastening a construction element within a mineral substrate, the process comprising:
arranging separately produced component A and component B of a multi-component mortar system comprising:
a curable aqueous-phase aluminous cement component A, and
an initiator component B in aqueous-phase for initiating a curing process;
wherein component A comprises at least one blocking agent and water, and component B comprises an initiator, at least one mineral filler, and water, in separate containers, ejecting component A and component B by a mechanical device, guiding component A and component B through a mixing device, to obtain a mixture of component A and component B, injecting the mixture of component A and component B into a borehole, inserting the construction element into the borehole, and leaving the mixture of component A and component B to set and harden, wherein said multi-component mortar system has an initial set-time of at least 10 min.

2. The process according to claim 1, wherein a volume ratio of component A to component B is 1:1 to 7:1.

3. The process according to claim 1, wherein a volume ratio of component A to component B is 1:3 to 1:2.

4. The process according to claim 1, wherein the at least one blocking agent is selected from the group consisting of phosphoric acid, metaphosphoric acid, phosphorous acid, and phosphonic acid.

5. The process according to claim 1, wherein the initiator comprises a mixture of alkali and/or alkaline earth metal salts, and/or wherein the at least one mineral filler is selected from the group consisting of limestone fillers, sand, corundum, dolomite, alkaline-resistant glass, crushed stones, gravels, pebbles, and mixtures thereof.

6. The process according to claim 1, wherein the mechanical device is a dispenser, and/or wherein the mixing device is a static mixer.

7. The process according to claim 1, wherein the separate containers are foil bags cartridges, cylinders, or capsules.

* * * * *